United States Patent
Visconti et al.

[11] Patent Number: 6,093,272
[45] Date of Patent: Jul. 25, 2000

[54] METHOD OF MAKING TRIM PANEL HAVING TWO DIFFERENT TRIM MATERIALS

[75] Inventors: Carl Henry Visconti, Clarkston; Michael William Jary, Farmington Hills; Edward Joseph Wenzel, Troy, all of Mich.

[73] Assignee: General Motors Corporation, Detroit, Mich.

[21] Appl. No.: 09/106,319

[22] Filed: Jun. 29, 1998

[51] Int. Cl.⁷ ..................................................... B32B 31/00
[52] U.S. Cl. .......................... 156/219; 156/212; 156/213; 156/214; 156/221
[58] Field of Search ..................... 156/196, 201, 156/202, 212, 213, 216, 221, 227, 477.1, 219, 214, 91; 264/245, 246, 249, 257, 258, 46.5

[56] References Cited

U.S. PATENT DOCUMENTS

| | | | |
|---|---|---|---|
| 4,779,390 | 10/1988 | Repper et al. | 52/222 |
| 4,861,543 | 8/1989 | Rafferty | 264/48.8 X |
| 4,978,407 | 12/1990 | Ardissone | 156/216 |
| 5,037,591 | 8/1991 | Rohrlach et al. | |
| 5,073,318 | 12/1991 | Rohrlach et al. | |
| 5,082,609 | 1/1992 | Rohrlach et al. | |
| 5,091,031 | 2/1992 | Strapazzini | |
| 5,133,912 | 7/1992 | Hagiwara et al. | 264/46.4 |
| 5,162,092 | 11/1992 | Klobucar et al. | |
| 5,304,273 | 4/1994 | Kenrick et al. | 156/219 |
| 5,462,786 | 10/1995 | Van Ert | 428/171 |
| 5,705,005 | 1/1998 | Ash | 156/245 X |

FOREIGN PATENT DOCUMENTS

| | | |
|---|---|---|
| 0018951 | 11/1980 | European Pat. Off. . |
| 61-027225 | 2/1986 | Japan . |
| 63-041116 | 2/1988 | Japan . |
| 02206521 | 8/1990 | Japan . |

*Primary Examiner*—Jeff H. Aftergut
*Attorney, Agent, or Firm*—Kathryn A. Marra

[57] ABSTRACT

A mold is provided having the shape of the trim panel and having a blade projecting from the mold at the juncture between the first and second regions to be covered by the different sheet materials. A first sheet material is provided and cut to fit the first region and also extend over the blade. This first sheet is draped over the mold and the blade. A second sheet material is bonded to a rigid substrate material, with the rigid substrate material having a flange structure along the edge margin thereof which is adapted to snap-fit over the blade of the mold and thereby hold in place the first sheet material which had previously been draped over the blade. The mold is then closed and a suitable molding material is injected to adhere to the back side of the first sheet material and the substrate layer of the second sheet material to thereby form the rigid trim panel. The mold is opened and the rigid trim panel is removed from the blade.

3 Claims, 3 Drawing Sheets

METHOD OF MAKING TRIM PANEL HAVING TWO DIFFERENT TRIM MATERIALS

TECHNICAL FIELD

This invention relates to a method of making a motor vehicle trim panel having regions of different aesthetic characteristics, such as color or material.

BACKGROUND OF THE INVENTION

It is well known in motor vehicles to provide a trim panel for covering the vehicle interior structure, such as the instrument panel or the door.

Vehicle trim panels are typically comprised of a cloth or vinyl covering over a rigid substrate.

It is desirable to provide such a trim panel having regions of different aesthetic characteristics. For example, it may be desirable to provide a two-tone door trim panel having regions of different colors, or it may be desirable that a first region be covered with a sheet vinyl material and a second region in an adjacent region be covered with a sheet of fabric.

The present invention provides a new and improved method for manufacturing vehicle interior trim panels such as door panels and instrument panels in which different regions of the trim panel have different colors, materials or other aesthetic characteristics.

SUMMARY OF THE INVENTION

According to the invention, a mold is provided having the shape of the trim panel and having a blade projecting from the mold at the juncture between the first and second regions to be covered by the different sheet materials. A first sheet material is provided and cut to fit the first region and also extend over the blade. This first sheet is draped over the mold and the blade. A second sheet material is bonded to a rigid substrate material, with the rigid substrate material having a flange structure along the edge margin thereof which is adapted to snap-fit over the blade of the mold and thereby hold in place the first sheet material which had previously been draped over the blade. The mold is then closed and a suitable molding material is injected to adhere to the back side of the first sheet material and the substrate layer of the second sheet material to thereby form the rigid trim panel. The mold is opened and the rigid trim panel is removed from the blade.

BRIEF DESCRIPTION OF THE DRAWINGS

The objects, features and advantages of the invention will become apparent upon consideration of the description of the preferred embodiment and the appended drawings in which.

DESCRIPTION OF THE PREFERRED EMBODIMENT

Figure 1:
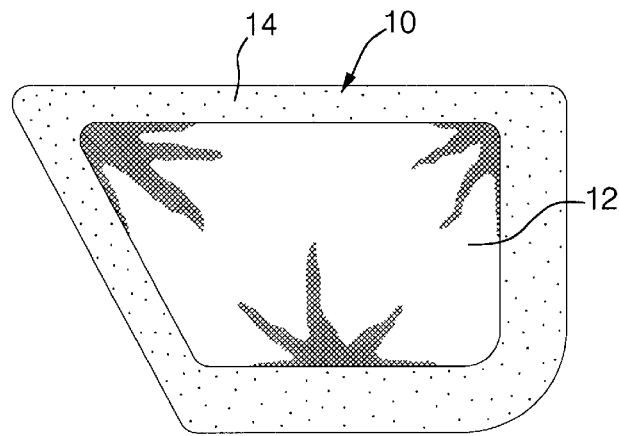
FIG. 1 is an elevation view of a door panel having regions covered by different flexible sheet trim materials, including an inner region and an outer region.

Referring to FIG. 1, a vehicle door trim panel 10 is shown having a central region 12 and an outer region 14. It will be understood that the inner region 12 and the outer region 14 are covered by flexible sheet trim materials such as sheet vinyl or cloth which have different aesthetic or softness characteristics. For example, the inner panel 12 may be of cloth and the outer panel 14 may be of thermoplastic material such as TPO or vinyl. Alternatively, both the panels may be covered with the same material, but the material may be of different colors or patterns. The material, color and pattern are chosen by the designer to provide an aesthetically pleasing trim panel 10.

Figure 2:
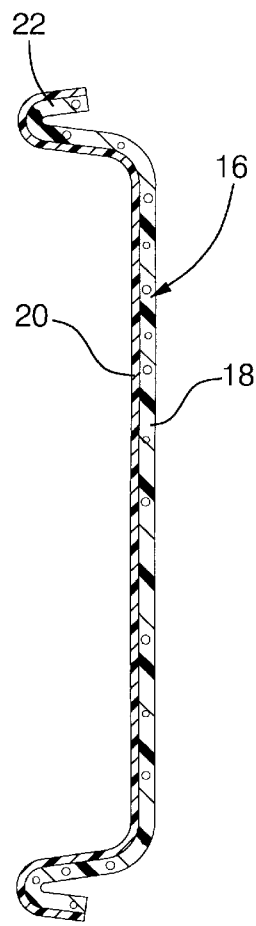
FIG. 2 is a section view showing a first flexible sheet material mounted on a rigid substrate material and which will define the inner region panel of the door trim panel.
Figure 3:
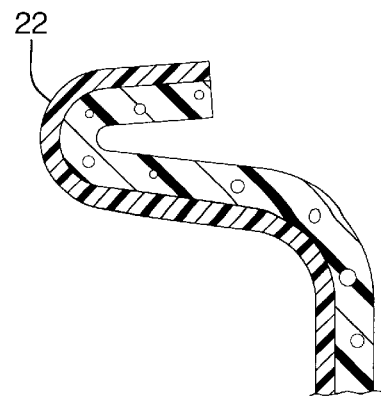
FIG. 3 is an enlarged fragmentary view showing a flange structure formed integrally around the edge margin of the inner region panel of FIG. 2.

FIG. 2 shows a composite panel 16 which will form the inner region 12 of the door panel 10. The composite panel 16 is comprised of a sheet of flexible sheet material 18 which is suitably bonded to a rigid substrate material 20. The composite panel 16 may be formed via any known manufacturing process. For example, the flexible sheet material 18 can be bonded, for example, by glue, to a thermoplastic sheet material. The laminate of cloth and thermoplastic material may then be heated in an infrared heater and vacuum formed or compression formed to the shape of FIG. 2. As best seen in FIG. 3, the composite panel 16 has a U-shaped flange structure 22 provided continuously around the edge margin thereof for purposes to be described hereafter.

Figure 4:
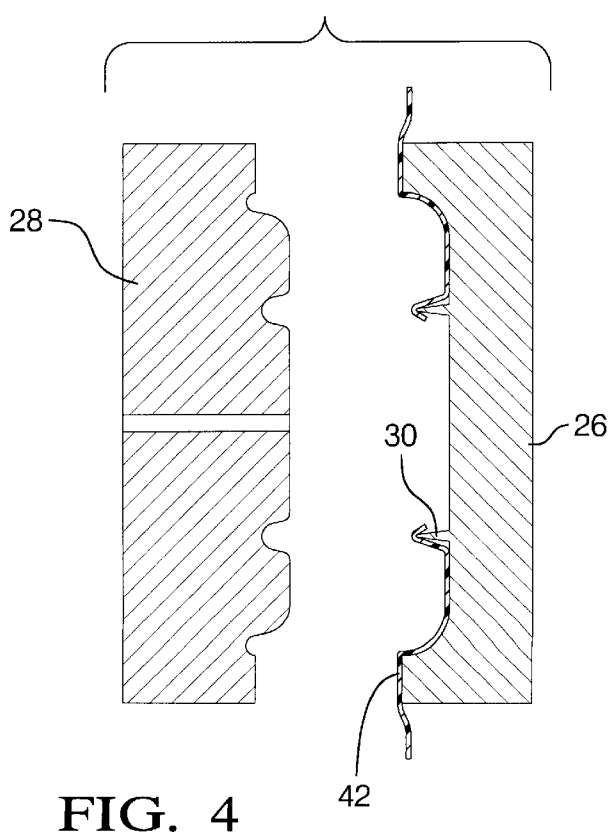
FIG. 4 is a section view showing a mold in which a second sheet of trim material has been draped over blades provided on the mold.

Referring to FIG. 4, a mold including mold halves 26 and 28 is shown in an open condition but can be closed together to define the shape of the door trim panel 10. The mold half 26 has a blade structure 30 which projects into the cavity space between the two mold halves at the intended juncture between the inner region 12 and outer region 14 of the trim panel 10. As seen in FIG. 4, a flexible sheet material 42 has been roughly trimmed to the shape of the outer region 14 and has excess material along the inner margin thereof to be draped over the blade structure 30 as shown in FIG. 4.

Figure 5:
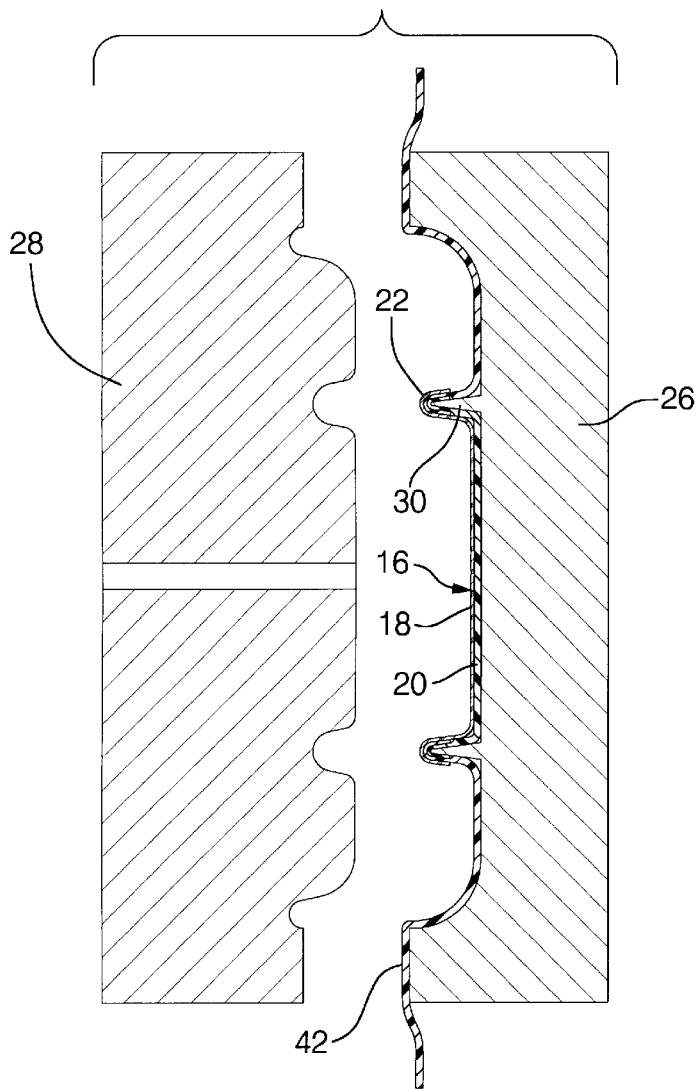
FIG. 5 is a section view similar to FIG. 4 but showing the center portion panel of FIG. 2 having been snapped over the blades of the mold.
Figure 6:
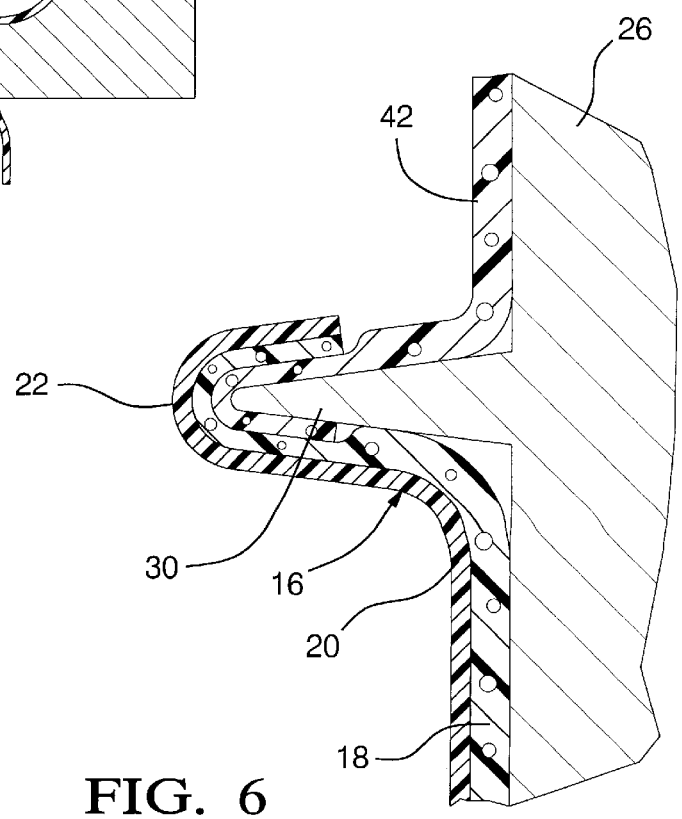
FIG. 6 is an enlarged fragmentary view similar to FIG. 3 but showing the flange structure at the edge margin of the inner region panel snapped over the blade.

As seen in FIG. 5, the composite panel 16 of FIG. 3 is installed onto the mold half 26 with the flange structure 22 along the edge margin thereof snapped over the sheet material 42. The flange structure 22 captures the marginal edge of the sheet material 42 and retains sheet material 42 on the blade structure 30 as best seen in the enlarged fragmentary view of FIG. 6.

Figure 7:
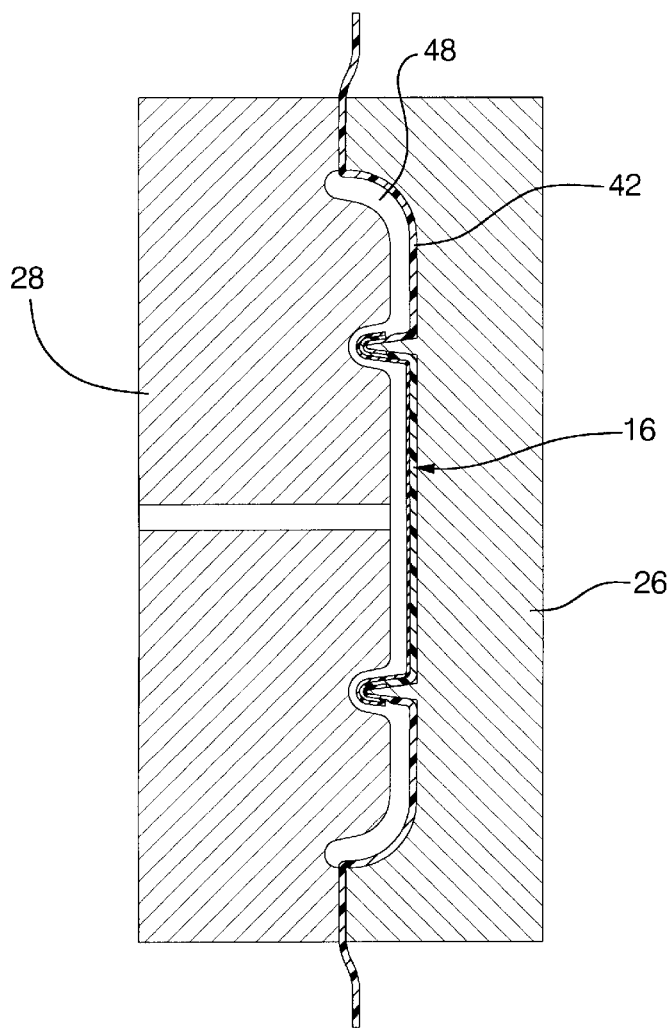
FIG. 7 is a section view showing the mold having been closed in readiness for injection of a suitable plastic material.
Figure 8:
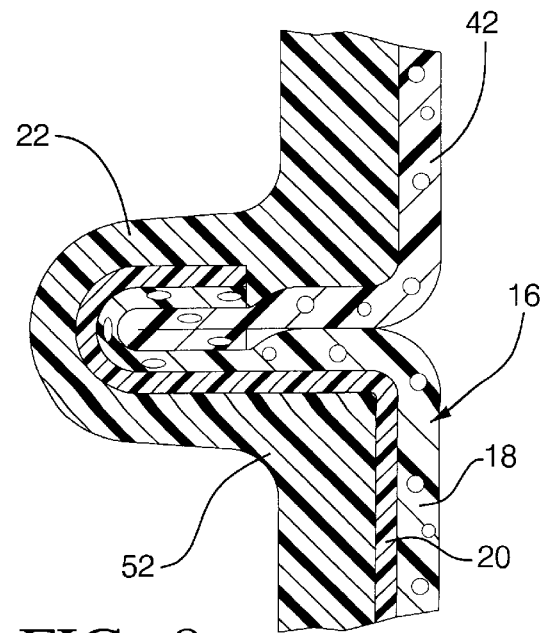
FIG. 8 is an enlarged view showing a portion of the finished trim panel at the juncture between the center region and outer region thereof.

FIG. 7 shows the mold halves 26 and 28 in their closed positions to define a mold cavity 48 behind the composite panel 16 and the sheet material 42. A suitable molding material is then injected into the cavity 48 so that the injected plastic adheres to the back sides of the composite panel 16 and cloth material 42, thereby adhering to these materials and providing an integral, rigid backing 52 for the door trim panel 10. After suitable curing, the molds 26 and 28 are opened, and the door trim panel 10 is removed from the mold. As best seen in the enlarged fragmentary view of FIG. 8, upon removal of the trim panel 10 from the mold and from the blade structure 30 thereof, the trim material 18 of the inner region 12 and 42 of the outer region are held together with the line of demarcation and overlap between these materials being hidden at the bottom of a groove which results upon withdrawal of the blade structure 30 from between the trim materials 18 and 42.

If desired, a layer of felt, foam or other soft material may be provided under the sheet materials 18 and/or 42 to provide a soft feel.

It will be understood and appreciated that the blade can be varied in its cross section to provide the desired degree of snap retention of the laminate panel over the blade structure. For example, the blade structure may have a V-shaped cross section as shown in the drawings or may have a bulb shape at the end to facilitate a snap fit of the flange structure 22 of the inner panel 16 over the blade structure 30.

It will also be understood that the process can be used with either injection molding or compression molding processes. In the case of compression molding, a sheet material, log material or extruded material is introduced into the cavity 48 and then the mold is closed to compress the plastic material against the back sides of the composite panel 16 and the sheet material 42.

It will be understood that the foregoing description of the preferred embodiment is merely exemplary of this manufacturing process, which can be employed to make a variety of motor vehicle interior trim components such as door panels, instrument panels and other vehicle trim.

Furthermore, although the drawings shown a trim panel in which the outer region completely surrounds the inner region, the invention is not so limited. Instead, for example, the trim panel could have an upper region of one material and a lower region of a different material.

Thus, it is seen that the invention provides a new and improved method for the manufacture of a vehicle trim panel having adjacent regions of different aesthetic characteristics.

What is claimed is:

1. Method of manufacturing a rigid vehicle trim panel having first and second regions covered by different flexible sheet trim materials, comprising:

providing a mold for the shape of the trim panel and having a blade projecting from the mold at the junction between the first and second regions to be covered by the different sheet materials;

providing first and second sheets of flexible sheet material having the desired aesthetic characteristics;

cutting the first sheet material to fit the first region and extend over the blade and draping the first sheet over the mold and blade;

providing a rigid substrate material having a flange structure along an edge margin thereof;

forming a composite panel by bonding the second sheet material to the rigid substrate material;

installing the composite panel onto the mold with the flange structure of the rigid substrate snapped over the first sheet material and capturing a marginal edge of the first sheet material and retaining the first sheet material on the blade of the mold;

closing the mold and adhering a suitable molding material to the first sheet material and the rigid substrate material of the second sheet material to thereby form the rigid trim panel; and opening the mold and removing the rigid trim panel from the blade and hiding a line of demarcation between the first sheet material and second sheet material from view at a bottom of a groove defined by the blade.

2. The method of claim 1 further comprising one of the first and second sheet materials being thermoplastic material and the other being fabric.

3. The method of claim 1 further comprising the first and second sheet materials being of the same material but of different colors.

* * * * *